Patented Mar. 13, 1934

1,950,437

UNITED STATES PATENT OFFICE 1,950,437

CATALYTIC PROCESS FOR POLYMERIZING CHLORO-BUTADIENE

Howard W. Starkweather, Brandywine Hundred, Del., assignor to E. I. du Pont de Nemours & Company, Wilmington, Del., a corporation of Delaware No Drawing. Application April 8, 1932
Serial No. 604,117

9 Claims. (Cl. 260—6)

This invention relates to the catalytic polymerization of organic materials, and more specifically pertains to the polymerization of chloro-2-butadiene-1,3 in the presence of catalysts which effect the formation of plastic polymers.

Prior art

Carothers and Collins application Serial No. 519,243, filed February 28, 1931 describes chloro-2-butadiene-1,3, $CH_2=C(Cl)-CH=CH_2$, and its production from monovinylacetylene and hydrogen chloride, a preferred process comprising passing monovinylacetylene into an aqueous solution containing hydrogen chloride and a cuprous chloride-ammonium chloride catalyst. The polymerization of chloro-2-butadiene-1,3 to obtain rubber-like polymers is described in Carothers and Collins application Serial No. 519,243, filed February 28, 1931. Williams application Serial No. 519,244, filed February 28, 1931, describes the polymerization of chloro-2-butadiene-1,3 under conditions which effect the formation of plastic polymer resembling unvulcanized Hevea rubber, the plastic polymer being readily cured by further polymerization to produce an elastic, non-plastic material. According to the Williams disclosure the chloro-2-butadiene-1,3 is allowed to polymerize until the viscosity increases to the consistency of glycerine, the unchanged chloro-2-butadiene-1,3 being then separated from the polymers either by distillation or by the addition of a liquid such as ethyl or methyl alcohol in which the chloro-2-butadiene-1,3 is soluble but in which the polymer is insoluble.

In Collins application Serial No. 537,484, filed May 14, 1931, a process is disclosed for the polymerization of a water emulsion of chloro-2-butadiene-1,3, to form a synthetic latex, but the polymer formed is non-plastic and resembles vulcanized rubber.

Description of invention

According to the teachings of the present invention, it has been found that small amounts of certain substances act catalytically to effect the polymerization of chloro-2-butadiene-1,3 at a much more rapid rate than when these substances are absent. The catalysts described herein are particularly useful when the polymerization is effected in the absence of light. Thus, where the polymerization is carried out under high superatmospheric pressure or under any other conditions where the presence of light is undesirable or inexpedient for practical reasons, the use of polymerization catalysts of the character described herein is of great value. The polymerization is very readily stopped before the solution sets to a solid gel and while still in the state in which it can be poured, the polymer, after removal of the monomer, corresponding to the plastic polymers described in the Williams application above referred to. The plastic polymer so produced is readily worked on rolls, compounded with modifying agents, antioxidants, fillers, dyes, etc., and may be further polymerized as described in the Williams application to produce a polymer resembling vulcanized rubber.

The catalytic materials referred to in the preceding paragraph which are particularly noted in this application are water, ethylene oxide, and dioxane. These materials may be commingled with the chloro-2-butadiene-1,3, preferably in amounts up to 2% of the chloro-2-butadiene-1,3, and in the presence or absence of other modifying materials. They may be used at room temperature or at slightly elevated temperature, at atmospheric pressure or at high superatmospheric pressure, and uniformly accelerate the polymerization reaction with the production of the plastic polymers already mentioned.

Objects of invention

This invention has for an object the polymerization of chloro-2-butadiene-1,3 in the presence of polymerization catalysts. A specific object resides in the use of small amounts of water, ethylene oxide and/or dioxane as a feature of the polymerization process. A further object resides in effecting the polymerization in the presence of the said catalysts and in the absence of light. A preferred object of the invention comprises the use of the stated catalysts during the high pressure polymerization of chloro-2-butadiene-1,3. Another object refers to a novel and highly efficient method for producing plastic chloro-2-butadiene-1,3 polymers. Other objects will appear from the following detailed description of the invention.

The following examples illustrate the preferred embodiments of the invention:

Example I

A sample of freshly distilled water-free chloro-2-butadiene-1,3 at 25° C. was 4% polymerized in 24 hours and 14% polymerized in 48 hours. A similar sample to which 1% water had been added was 10% polymerized in 24 hours and 24% polymerized in 47 hours. The polymerization in each case was carried on under atmospheric pressure and in the absence of light.

Example II

Samples of chloro-2-butadiene-1,3 which had been distilled from potassium hydroxide and pyrogallol in the absence of air to remove water and oxygen, and then placed in a thermostated bath at 35° C. and atmospheric pressure in the dark without being exposed to the air, polymerized only 2.4% in 117 hours. Duplicate samples which were exposed in the dark to the air but contained no added water polymerized 6.8% in 46 hours. The average polymerization of several duplicate samples which in addition to being exposed in the dark to the air contained 0.2 to 2.0% added water was 15.9% in 46 hours.

Example III

That water produces the same effect upon the rate of polymerization of chloro-2-butadiene-1,3 which has been exposed to atmospheric conditions during distillation is shown by the following example: A freshly distilled sample in a thermostated bath at 35° C. in the dark and at atmospheric pressure polymerized 7.4% in 23 hours while a second portion of the same material but containing 1% added water polymerized 17.6% in the same time under the same conditions.

Example IV

Water also accelerates the polymerization of chloro-2-butadiene-1,3 under pressure. Several samples of chloro-2-butadiene-1,3 have been subjected in the dark to a pressure of 1000 atmospheres at 25° C. and the average polymerization in the first 24 hours was 8% while a sample containing 1% added water was polymerized 25.6% in 8 hours, the other conditions being the same.

Example V

Water acts as a catalyst even when chloro-2-butadiene-1,3 is polymerized in solution. Chloro-2-butadiene-1,3 dissolved in an equal weight of carbon tetrachloride was polymerized only 14% in 66 hours at 1000 atmospheres and 25° C. while a similar solution containing 1% added water under similar conditions was polymerized 26.3% in 21 hours and a duplicate sample 34.3% in 27 hours. Each of these experiments was carried out in the absence of light.

Example VI

Ethylene oxide also accelerates the polymerization of chloro-2-butadiene-1,3. A sample of chloro-2-butadiene-1,3 was 8.5% polymerized at 35° C. in the dark in 23 hours. Another portion of this same material but containing 1% ethylene oxide was 21.4% polymerized in the same time under the same conditions.

Example VII

Chloro-2-butadiene-1,3 containing 1% pale crepe rubber in solution polymerizes more rapidly than pure chloro-2-butadiene-1,3 to yield plastic polymers. I have discovered that water or ethylene oxide added to chloro-2-butadiene-1,3 containing 1% pale crepe rubber causes it to polymerize even more rapidly giving the same desirable plastic polymers.

Several samples of the same lot of chloro-2-butadiene-1,3 with and without these added catalysts were kept in the dark at atmospheric pressure at 35° C. for 23 hours. The polymerization of the different samples was as follows:

| Sample | Percent polymerization |
|---|---|
| Chloro-2-butadiene-1,3 | 8.5 |
| Chloro-2-butadiene-1,3+1% pale crepe rubber | 26.9 |
| Chloro-2-butadiene-1,3+1% pale crepe rubber+1% water | 31.9 |
| Chloro-2-butadiene-1,3+1% pale crepe rubber+1% ethylene oxide | 39.3 |

Example VIII

Several samples of chloro-2-butadiene-1,3 containing 1% pale crepe rubber have been polymerized in the dark and at 1000 atmospheres at 25° C. and it has been found about 20% yield of plastic polymer can be obtained in 24 hours. Samples containing 1% ethylene oxide in addition to 1% pale crepe rubber under these same conditions were 23% polymerized in 11½ hours. Another sample containing 1% pale crepe rubber and 1% water under these same conditions was 9.9% polymerized in 3 hours.

Example IX

A mixture of 1% pale crepe rubber, 1% water and 1% ethylene oxide has been found to be very effective as catalyst for the polymerization of chloro-2-butadiene-1,3. A sample containing this mixture was 26% polymerized in 7.5 hours at 1000 atmospheres and room temperature. Another similar sample was 25.8% polymerized in 27 hours at room temperature and atmospheric pressure. Each of these experiments was carried out in the absence of light.

Example X

This mixture of 1% pale crepe rubber, 1% water and 1% ethylene oxide in chloro-2-butadiene-1,3 is effective as a catalyst even in the presence of a solvent. A sample of this mixture with an equal weight of carbon tetrachloride subjected to a pressure of 1000 atmospheres at room temperature for 8 hours, was found to be 18.3% polymerized. A sample containing 1% pale crepe rubber, but no water or ethylene oxide under similar conditions was polymerized 27.3% in 17.2 hours. Each of these experiments was carried out in the absence of light.

Example XI

Water acts to assist the catalytic activity of certain other substances which when added to chloro-2-butadiene-1,3 catalyze its polymerization. This is shown by the yields from samples kept in a thermostat at 35° C. and in the dark for 23 hours.

| Sample | Percent polymerization |
|---|---|
| Chloro-2-butadiene-1,3 | 8.4 |
| Chloro-2-butadiene-1,3+2% dichloro-2,3-butadiene-1,3 | 10.0 |
| Chloro-2-butadiene-1,3+1% water | 14.4 |
| Chloro-2-butadiene-1,3+1% water+2% dichloro-2,3-butadiene-1,3 | 20.2 |

Dichloro-2,3-butadiene-1,3, referred to in the above example, is described in a copending application of Carothers & Berchet, Serial No. 589,052, filed Jan. 26, 1932. It may be prepared by chlorinating chloro-4-butadiene-1,2 or dichloro-2,4-butene-2, the pentachloro-1,2,2,3,4-butane and trichloro-2,3,4-butane which are among the reaction products being subjected to treatment with caustic alkali to split off three or one moles of hydrogen chloride respectively, yielding the dichlorobutadiene.

Example XII

An effect similar to that with dichloro-2,3-butadiene-1,3 is shown with dioxane. These samples were kept in the dark at 35°–38° C. for 23 hours.

| Sample | Percent polymerization |
|---|---|
| Chloro-2-butadiene-1,3 | 7.4 |
| Chloro-2-butadiene-1,3+1% 1:4 dioxane | 8.2 |
| Chloro-2-butadiene-1,3+1% water | 17.6 |
| Chloro-2-butadiene-1,3+1% water+1% 1:4 dioxane | 21.9 |

The above example indicates not only the promoting catalytic action of water and dioxane, but also indicates that dioxane itself is a catalyst for the polymerization of chloro-2-butadiene-1,3.

The percentages of catalyst named in the above examples are all based upon the chloro-2-butadiene-1,3 present rather than on the total amount of material present.

In carrying out the principles of the invention, any suitable expedient which effects a good contact of chloro-2-butadiene-1,3 may be used. Thus, the material undergoing polymerization may be agitated during polymerization to effect uniform solution or dispersion of the catalyst.

As indicated in the examples, the chloro-2-butadiene-1,3 may be either in the form of a solution or not. Certain of the above examples describe the polymerization of chloro-2-butadiene-1,3 dissolved in carbon tetrachloride. Solvents for chloro-2-butadiene-1,3 other than carbon tetrachloride may be used in lieu thereof, e. g., carbon bisulfide, chloroform, toluene, and other liquids having similar solvent properties.

In each of the above examples the polymerization reactions referred to were terminated at a point where the solution containing the polymer also contained quite a large amount of unpolymerized chloro-2-butadiene-1,2, the solution having sufficient fluidity to be poured and the obtained polymer possessing distinctly plastic properties after removal of the unpolymerized material. In each case, the plastic polymer was susceptible of being compounded, worked under rollers, and further polymerized to give an elastic product resembling vulcanized rubber.

It is evident from the above examples that the temperatures and pressures utilized for the catalytic polymerization of chloro-2-butadiene-1,3 can be varied within an appreciable range. The preferred range of temperature is between 0–50° C., and the preferred range of pressure 1–5000 atmospheres.

The above description and specific examples are to be construed as illustrative only and not as limiting the scope of the invention. Any modification or variation therefrom which conforms to the spirit of the invention is intended to be included within the scope of the claims.

I claim:

1. A process which comprises polymerizing chloro-2-butadiene-1,3 in the presence of a catalyst taken from the group consisting of water, ethylene oxide, and dioxane.

2. A process which comprises polymerizing chloro-2-butadiene-1,3 in the presence of a catalyst taken from the group consisting of water, ethylene oxide, and dioxane in the substantial absence of light.

3. A process which comprises polymerizing chloro-2-butadiene-1,3 in the presence of a catalyst taken from the group consisting of water, ethylene oxide, and dioxane to a point at which a substantial amount of chloro-2-butadiene-1,3 still remains unpolymerized, then removing the unpolymerized material from the polymer.

4. A process which comprises polymerizing chloro-2-butadiene-1,3, in the presence of a catalyst taken from the group consisting of water, ethylene oxide, and dioxane in amounts up to 2% of the chloro-2-butadiene-1,3.

5. A process which comprises polymerizing chloro-2-butadiene-1,3 in the presence of a catalyst taken from the group consisting of water, ethylene oxide, and dioxane until a plastic polymer is formed.

6. The process which comprises polymerizing chloro-2-butadiene-1,3 in the presence of a polymerization catalyst, the activity of the same catalyst being assisted by the further presence of a member of the group consisting of water, ethylene oxide and dioxane.

7. The process which comprises polymerizing chloro-2-butadiene-1,3 in the presence of catalytic amounts of water and until a plastic polymer is formed, then separating the plastic polymer so produced.

8. A process which comprises polymerizing chloro-2-butadiene-1,3 in the presence of a catalyst taken from the group consisting of water, ethylene oxide, and dioxane under superatmospheric pressure.

9. A process which comprises polymerizing chloro-2-butadiene-1,3 in the presence of a catalyst taken from the group consisting of water, ethylene oxide, and dioxane under superatmospheric pressure, and in the substantial absence of light.

HOWARD W. STARKWEATHER.

CERTIFICATE OF CORRECTION.

Patent No. 1,950,437.　　　　　　　　　　　　　　　March 13, 1934.

HOWARD W. STARKWEATHER.

It is hereby certified that error appears in the printed specification of the above numbered patent requiring correction as follows: Page 2, line 150, for "butane" read butene; and that the said Letters Patent should be read with this correction therein that the same may conform to the record of the case in the Patent Office.

Signed and sealed this 15th day of May, A. D. 1934.

Bryan M. Battey (Seal)　　　　　　　　　　　　　　　Acting Commissioner of Patents.